Patented Nov. 20, 1923.

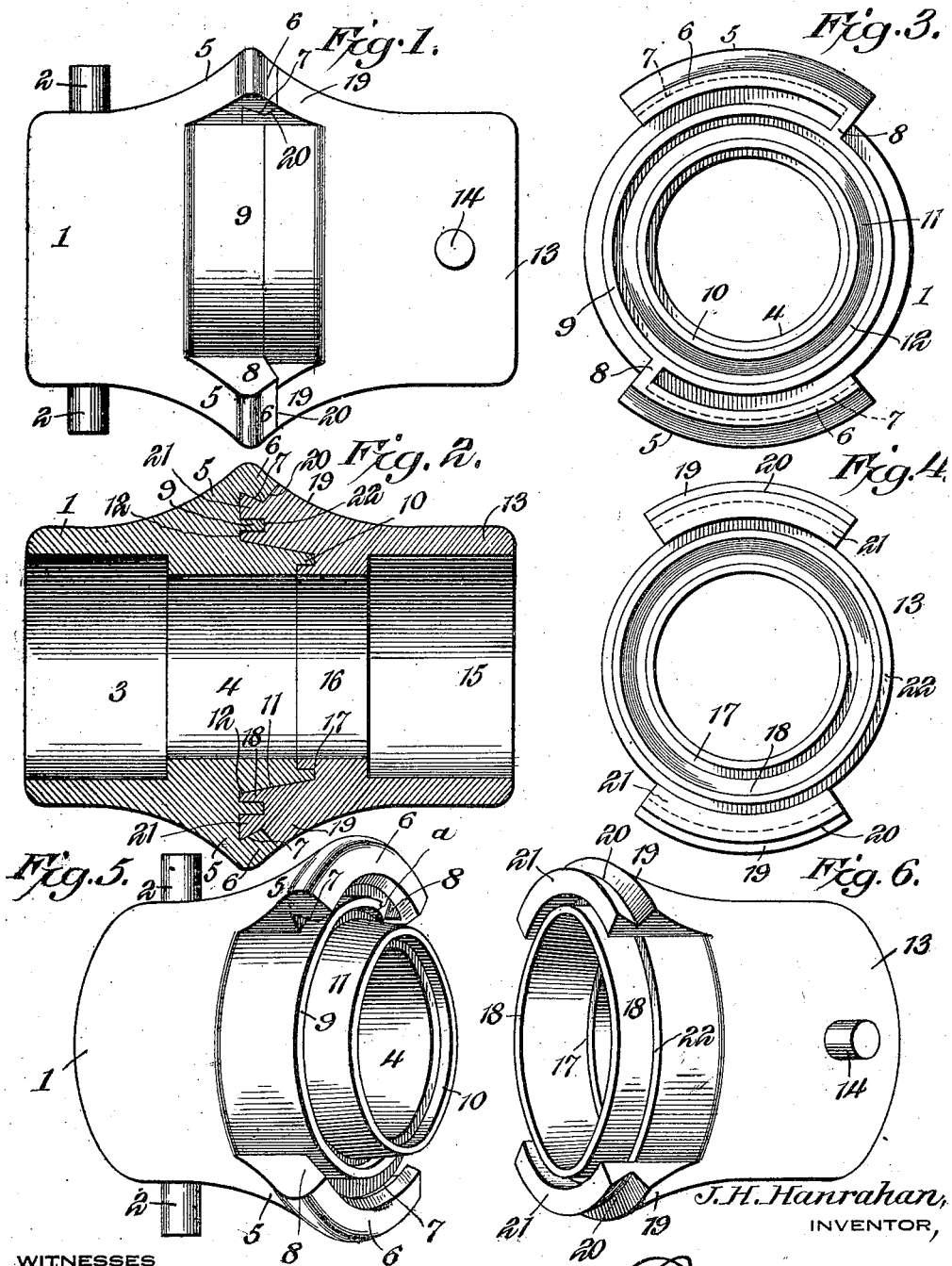

1,474,586

UNITED STATES PATENT OFFICE.

JOHN H. HANRAHAN, OF GUILFORD, CONNECTICUT.

HOSE COUPLING.

Application filed January 14, 1922. Serial No. 529,302.

*To all whom it may concern:*

Be it known that I, JOHN H. HANRAHAN, a citizen of the United States, residing at Guilford, in the county of New Haven and State of Connecticut, have invented new and useful Improvements in Hose Couplings, of which the following is a specification.

This invention relates to hose couplings. The object is to provide a device for coupling sections or lengths of flexible or other kinds of hose together, such as fire hose, the same consisting of a pair of cooperating sleeves or members having interfitting parts, which when properly applied to each other, rigidly bind the ends of two adjacent sections together in a manner to prevent their separation under pressure of the water conveyed therethrough and to prevent any leakage between the abutting faces of the said coacting members.

Another object is to provide such sleeves or members of a construction that they may be readily produced by a simple casting operation, the only machining necessary being to provide certain parts thereof with ground surfaces to insure their close fitting relation when applied to each other, the interlocking operation requiring only a quarter turn of the two members with relation to each other to bind them securely together, the construction being such that it is impossible to apply the members in any but the proper manner or to give the same a relative rotary movement of more than a quarter turn.

A full and complete understanding of the invention may be obtained from a consideration of the following detailed description, taken in connection with the accompanying drawing forming part of this specification, it being understood that while the drawing shows a practical form of the invention, the latter is not to be confined to strict conformity therewith, but may be changed or modified so long as such changes or modifications mark no material departure from the salient features of the invention, as specifically pointed out in the appended claims.

In the drawing, in which similar reference characters designate corresponding parts throughout the several figures:

Figure 1 is a side elevation of the coupling, the two members comprising the same being locked together, the sections of hose being omitted.

Figure 2 is a longitudinal sectional view of the same.

Figure 3 is an end elevation of one of the members, looking at the coacting end of the same.

Figure 4 is a similar view of the other member.

Figures 5 and 6 are perspective views of the members in the relative positions they assume when they are locked together.

While the two members comprising the coupling are, to all appearances similar externally, their coacting portions are different, consisting of what may be termed a male and a female member respectively, and the same will be described separately.

The left hand member, as viewed in Figures 1 and 2, constitutes the female member and consists of a casting formed of suitable metal, such as brass, to resist corrosion or rust, the casting being in the form of a tubular sleeve 1 having a pair of diametrically opposite studs or lugs 2 for the purpose of turning the member by force through the medium of a spanner, in a well known manner. The sleeve is provided with a longitudinal bore 3 of a diameter to receive and to hold, in any desired manner, the end of a section of flexible hose, such as fire hose (not shown), though the same may be threaded for the purpose of applying the same to the end of a section of metal pipe, as will be understood.

The inner end of the sleeve is provided with a counterbore 4 of somewhat smaller diameter than the bore 3, and adapted to aline with and form a continuation of the passage through the aforesaid hose. At its inner end, the female member 1 is provided with external, diametrically opposite enlargements 5, formed by curving the walls of the sleeve outwardly adjacent to the end of the same, to provide arcuate locking portions for engagement with certain portions of the male member. The arcuate locking portions have forwardly extending arcuate flanges 6, whose inner opposed faces 7 are undercut or dove-tailed providing a curved channel terminating at diametrically opposite or corresponding ends of the flanges 6, in abutment walls or stops 8, as clearly shown in Figures 3 and 5 of the drawing.

A continuous, annular rib 9 is formed integrally with the sleeve, said rib being thinner than the flanges 6 and forming the inner or bottom wall of the dove-tailed channel, where passing within the overhanging flanges 6, the outer wall of the rib 9 extending backwardly some distance between the arcuate enlargements 5, as clearly shown in Figures 1 and 5.

The forward or active end of the sleeve 1 is provided with an annular extension 10 in spaced relation to the end of the bore 4 thereof, the outer, circumferential wall 11 of the same being inclined and extending backwardly as far as the base of the aforesaid annular rib 9, to provide an annular channel 12 between the rib 9 and the extension 8. In Figure 5 the annular rib 9 has been broken away at $a$ in order to disclose the abutment 8 at the distant end of the dove-tailed channel within the flange 6.

The male member comprises a sleeve 13 having studs 14, and a longitudinal passage or bore 15 for the reception of the end of a section of hose (not shown), and terminating at the inner end in a counterbore 16 corresponding in diameter with the bore 4 of the female member, though somewhat shorter than the same, as shown in Figure 2 of the drawing, the said counterbores 4 and 16 respectively being adapted to match end to end, when the members are applied to each other, and to form a smooth continuation of the interior of the sections of hose.

The inner end of the sleeve 13 is provided with an annular channel 17 corresponding in diameter, width and length to the annular rib 10, which latter is adapted to be firmly seated therein, and the male member is further provided with a forwardly projecting, annular flange 18, whose inner wall is tapered to snugly receive the wall 11 of the female member, the forward or outer end of the flange 18 fitting within the annular channel 12, when the parts are locked together.

The sleeve 13 is further provided with integral, diametrically opposite arcuate enlargements 19, similar in contour to the enlargements 5, and provided with arcuate seats 20 for the reception of the overhanging flanges 6 of the female member, the arcuate dove-tailed projections 21 extending forwardly from the front walls of the enlargements 19 being adapted to be moved in a rotary direction within the dove-tailed seats between the undercut or dove-tailed faces 7 and the annular rib 9, until the end of said projection 21 strikes against the abutment wall 8, when further rotary movement is arrested and the members are locked together.

It will be noted that the respective enlargements 5 and 19 are somewhat less than a quadrant in length so that when applying the two members in a manner to be described it requires less than a quarter of a full turn of the two members with relation to each other to rigidly lock the same together.

In applying the two members together, it is only necessary to locate the enlargements 19 of the male member between the enlargements 5 of the female member, and to shove the same together until the rib 10 abuts against the inner wall of the anular channel 17, and the annular rib 9 seats itself in the corresponding wall 22 of the male member, when the projections 21 of the same member are in a position to be moved in a rotary direction to enter the seats within the undercut faces 7 of the enlargements 5, and to be turned until they strike against the end walls 8, when further movement is arrested and the parts are securely held together. By properly machining the surfaces that are brought into contact with each other, a perfect fit may be obtained for preventing any leakage of water.

From the foregoing it will be seen that a simple construction of hose coupling has been provided, which may be manufactured at a low cost and which may be readily applied to any pipe or hose in any approved manner, and that by simply applying the two coacting members to each other in the proper manner, the coupling may be effected by less than a quarter turn of the two members, and this may be accomplished in the dark by merely feeling the same. The uncoupling is readily accomplished, the lugs 2 and 14 rendering the action easy should the members, for any reason, become difficult to manipulate.

What is claimed is:

1. A coupling comprising a pair of opposed, coacting sleeves having similar outstanding, integral arcuate enlargements located at their abutting ends and arranged in pairs diametrically opposite each other, one pair of enlargements carried by one of the sleeves having dove-tailed channels open at the front and at one end and terminating at the other end in an abutment wall, the other pair of enlargements carried by the other sleeve having longitudinally projecting, arcuate, dove-tailed projections adapted to enter the opposite, open ends of the said dove-tail channels of the other member and upon relative rotary motion to abut against said end walls and arrest the rotary motion and lock the members together, said members having interfitting annular ribs and channels with uniformly tapered engaging surfaces to prevent leakage.

2. A coupling comprising two coacting members, one member having a continuous annular rib on its abutting face, and an annular extension coaxial with said rib and projecting from said abutting face axially beyond the end of the sleeve, with the outer wall of the extension tapered inwardly, said extension being spaced from the rib at its inner end, and the other member having an annular channel corresponding with the said rib and adapted to receive the same, and an annular flange with a tapered inner wall to fit the tapered outer wall of said extension, and a pair of arcuate enlargements arranged diametrically opposite each other on each member, said enlargements being formed with interlocking arcuate projections and channels.

3. A coupling comprising two coacting members, one member having an annular extension projecting outwardly from its abutting face and having a cylindrical inner wall and an outer wall tapered inwardly, and the other member having an annular flange projecting outwardly from its abutting face and having its inner wall tapered to fit the outer tapered wall of said extension and an inner annular flange fitting inside the cylindrical inner wall of the extension, and a pair of integral arcuate enlargements arranged diametrically opposite each other on each member, the enlargements on one member having an undercut channel with one end closed and the enlargements of the other member having dove-tailed projections to fit said channels.

4. A coupling comprising two coacting members, each formed of one piece and provided with a longitudinal bore, one of said members having arcuate flanges whose inner faces are undercut forming a curved channel with an abutment wall at one end of the channel, a continuous annular rib forming the inner wall of said channel, and an annular extension extending beyond the bore of said member and having its outer wall tapered and spaced from said annular rib, the other member having an annular channel corresponding with said annular rib, an annular flange with a tapered inner wall to fit the tapered outer wall of said annular extension, an inner annular flange fitting inside of the annular extension to form a continuous bore and its pair of enlargements each provided with arcuate seats for the reception of said flanges, and arcuate projections to fit within the channels of the first named member.

In testimony, that I claim the foregoing as my own, I have hereto affixed my signature.

JOHN H. HANRAHAN.